United States Patent
Davies

(10) Patent No.: US 9,219,511 B2
(45) Date of Patent: Dec. 22, 2015

(54) HIGH-INTEGRITY DATA TRANSMISSION SYSTEM

(75) Inventor: Robin William Davies, Rainham (GB)

(73) Assignee: BAE SYSTEMS plc, London (GB)

( * ) Notice: Subject to any disclaimer, the term of this patent is extended or adjusted under 35 U.S.C. 154(b) by 94 days.

(21) Appl. No.: 13/702,737

(22) PCT Filed: Aug. 2, 2011

(86) PCT No.: PCT/GB2011/051458
§ 371 (c)(1),
(2), (4) Date: Dec. 7, 2012

(87) PCT Pub. No.: WO2012/017232
PCT Pub. Date: Feb. 9, 2012

(65) Prior Publication Data
US 2013/0287143 A1 Oct. 31, 2013

(30) Foreign Application Priority Data

Aug. 4, 2010 (EP) .................................... 10275082
Aug. 4, 2010 (GB) .................................. 1013122.5

(51) Int. Cl.
*H04B 1/16* (2006.01)
*H04L 1/08* (2006.01)
*H04L 1/22* (2006.01)

(52) U.S. Cl.
CPC .. *H04B 1/16* (2013.01); *H04L 1/08* (2013.01); *H04L 1/22* (2013.01)

(58) Field of Classification Search
CPC ............ H04B 1/22; H04B 1/16; G01S 13/91; G08G 5/004; G05D 1/0055; G05D 1/0816
See application file for complete search history.

(56) References Cited

U.S. PATENT DOCUMENTS

| | | | | |
|---|---|---|---|---|
| 4,280,221 | A | * 7/1981 | Chun et al. ..................... | 375/288 |
| 6,052,753 | A | * 4/2000 | Doerenberg et al. ......... | 710/305 |
| 6,127,944 | A | * 10/2000 | Daly et al. ..................... | 340/963 |
| 6,915,444 | B2 | 7/2005 | Vasko et al. | |

(Continued)

FOREIGN PATENT DOCUMENTS

| | | |
|---|---|---|
| DE | 26 21 104 A1 | 12/1976 |
| EP | 1 936 386 A2 | 6/2008 |

(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Feb. 14, 2013, in the corresponding International Application No. PCT/GB2011/051458. (10 pages).

(Continued)

*Primary Examiner* — Aristocratis Fotakis
(74) *Attorney, Agent, or Firm* — Finch & Maloney PLLC

(57) ABSTRACT

A method of high-integrity data transmission including transmitting nominally-identical data via first and second channels, inverting the logic of the data in the second channel receiving the data via a respective data handling device for each channel, inverting the logic of data outputted by one of the data-handling devices and comparing the so-inverted data with data outputted by the other data handling device. The invention is relevant to the avoidance of common-mode failures in aircraft, other vehicles and plant employing high-integrity data systems.

12 Claims, 4 Drawing Sheets

(56) References Cited

U.S. PATENT DOCUMENTS

| | | | |
|---|---|---|---|
| 7,206,877 B1 * | 4/2007 | Doerenberg et al. | 710/100 |
| 2003/0051203 A1 | 3/2003 | Vasko et al. | |
| 2008/0147255 A1 * | 6/2008 | Alwin et al. | 701/14 |
| 2008/0218084 A1 | 9/2008 | Kulinna et al. | |
| 2011/0213535 A1 | 9/2011 | Eggert et al. | |

FOREIGN PATENT DOCUMENTS

| | | | |
|---|---|---|---|
| JP | 57-013835 A | 1/1982 | |
| WO | WO 03/023561 A2 | 3/2003 | |
| WO | WO 2010/022821 A1 | 3/2010 | |

OTHER PUBLICATIONS

International Search Report (PCT/ISA/210) issued on Sep. 27, 2011, by the European Patent Office as the International Searching Authority for International Application No. PCT/GB2011/051458.
European Search Report for EP 10275082.5 dated Mar. 28, 2011.
United Kingdom Search Report for GB 1013122.5 dated Nov. 10, 2010.

* cited by examiner

HIGH-INTEGRITY DATA TRANSMISSION SYSTEM

This invention relates to a high-integrity data transmission system, such as may be employed in an aircraft, spacecraft, submarine or other vehicle, in process plant, in nuclear electricity generating plant or in any other apparatus in which the reliable transmission of data is important for safety or other reasons.

High integrity data transmission systems employ parallel channels or lanes through which data from redundant sources are transmitted. The data are compared on receipt and, if the system is operating correctly, should be the same, within tolerance limits. Such systems potentially are vulnerable to "common mode failures" in which the same defect occurring at the same time in both channels can result in an undetected error in the received data. In prior art systems the risk of such failure is reduced by at least partially constructing one data channel using components different in design and manufacture from the components of the other channel. This however leads to greater cost and complexity in design, manufacture and maintenance. The present invention seeks to reduce this problem.

In one aspect, the invention provides a method of high-integrity data transmission comprising transmitting nominally-identical data via first and second channels, inverting the logic of the data in the second channel, receiving the data via a respective data handling device for each channel, inverting the logic of data outputted by one of the data-handling devices and comparing the so-inverted data with data outputted by the other data handling device.

The logic of the data in the second channel may be inverted before it is transmitted. Alternatively the logic of that data may be inverted after reception but before it is inputted to the data handling device of the second channel.

In another aspect the invention provides a data receiver for use with a data-transmission system having a first channel and a second channel for transmitting nominally-identical data, the receiver comprising inputs for receiving separately the data from the first and second channels, means for inverting the logic of the data received from the second channel, respective data-handling devices for receiving and outputting separately data from the first channel and data from the second channel, and processor means configured to invert the logic of data outputted by the data-handling device of one of the channels and to compare the so-inverted data with the data outputted by the data-handling device of the other channel.

By inverting the data logic in one channel, it is ensured that the data handling devices, which may for example be bus interfaces, of the two channels are not presented with the same combination of bits at the same time even thought the data being transmitted may inherently be identical. Thus a common-mode failure can be detected.

The inverting means may be an inverting buffer amplifier.

The invention also includes a data transmission system comprising a data transmission system comprising a first channel and a second channel for transmitting nominally-identical data, and a receiver as set forth above.

As noted above, instead of being inverted on arrival at the receiver, the data logic of the second channel may be inverted at some other location, e.g at a data transmitter.

Thus, in a further aspect, the invention provides a data receiver for use with a data-transmission system having a first channel and a second channel for transmitting nominally-identical data, the data in the second channel being logically inverted relative to the data in the first channel, the receiver comprising respective data-handling devices for receiving and outputting separately data from the first and second channels, and processor means configured to invert the logic of data outputted by the data-handling device of one of the channels and to compare the so-inverted data with the data outputted by the data-handling device of the other channel.

The invention also includes a data transmission system comprising a data transmission system comprising a first channel and a second channel for transmitting nominally-identical data, means for logically inverting the data in the second channel, and a receiver according to the further aspect set forth above.

In an embodiment of the invention, the data handling devices are interfaces, e.g. bus interfaces. It will be appreciated that common mode failures in a variety of data-handling devices may be mitigated by the present invention. In principle such a failure can be detected by means of the present invention anywhere in that part of a data transmission system of the invention in which the data logic in one channel is inverted relative to that in another channel.

The interfaces may comprise look-up tables for identifying the addresses of messages within the data, the look-up table of one of the interfaces having inverted logic relative to that of the other interface.

The receiver may comprise message stores for the first or second channels configured such that nominally-identical messages in the first and second channels are written to different addresses in the respective stores.

The invention now will be described merely by way of example with reference to the accompanying drawings, wherein.

Figure 1:
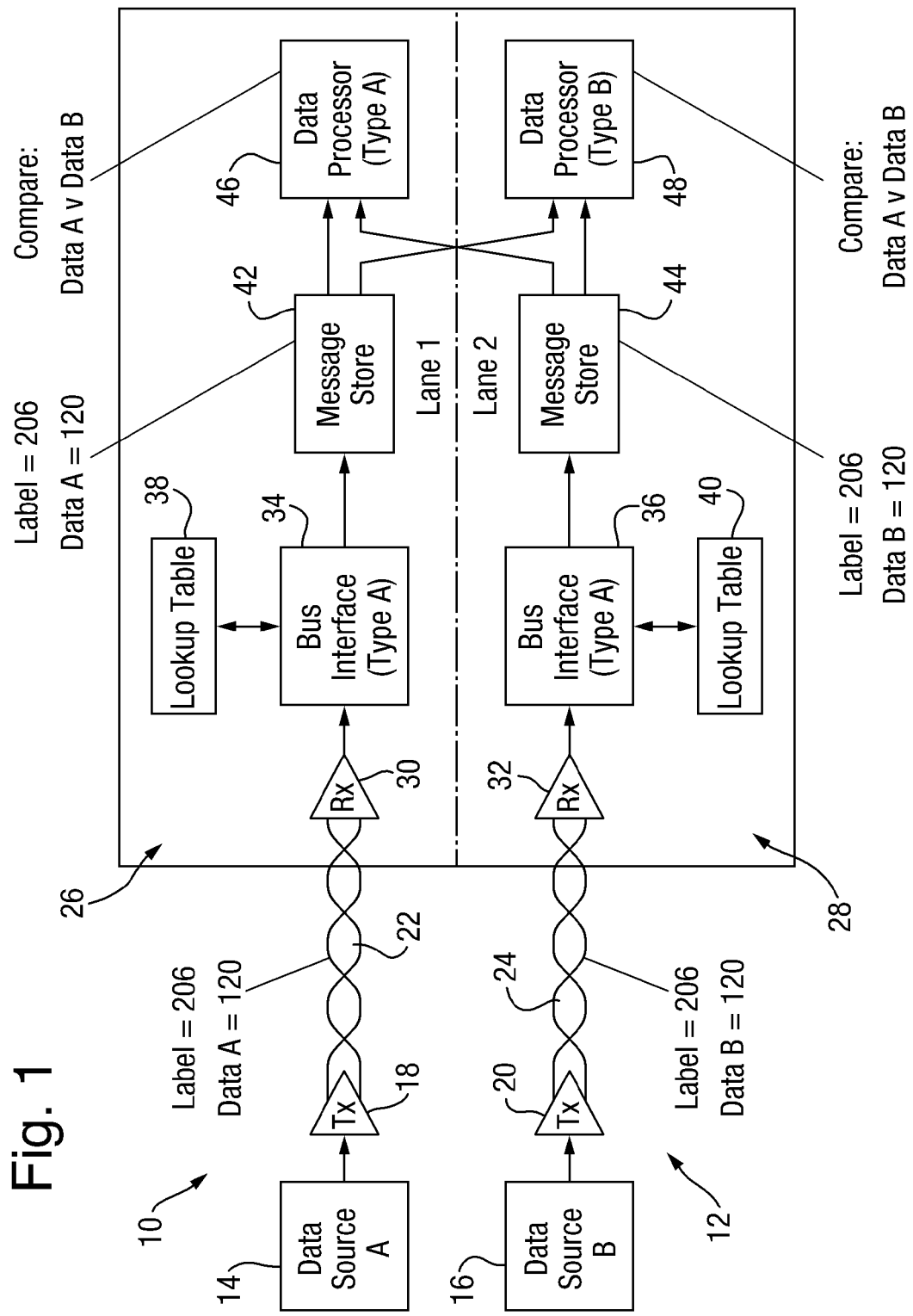
FIG. 1 shows a prior art data transmission system.

Referring to FIG. 1, a known data transmission system in an aircraft, typically to the ARINC 429 standard, has two lanes or channels 10, 12 for the transmission and processing of data. Nominally identical messages are produced by two data sources 14, 16 (one in each channel) which may be for example dynamic pressure sensors providing outputs indicative of airspeed. In accordance with ARINC 429, each message 32 bit words each of which includes an address portion and a data (information) portion.

In each channel, the messages are fed via transmitter buffer amplifiers 18, 20 to respective twisted-pair buses 22, 24 and thence to receiver portions 26, 28 of the system. Here the messages pass via receiver buffer amplifiers 30, 32 to bus interfaces 34, 36. Here the address labels of the messages are checked against respective look-up table 38, 40 and the messages are stored at respective addresses in message stores 42, 44. Each channel includes a data processor 46, 48 which reads the messages stored in each of the stores 42, 44 and compares them. If the messages as read are the same to within acceptable limits, the messages are accepted by the processors 46, 48 as correct, and are utilised by the aircraft's air data computer in controlling the aircraft. An unacceptable discrepancy between the messages results in them both being rejected, and the air data computer then switches to an alternative back-up system.

In FIG. 1, the system is illustrated as operating correctly; air speed data messages of 120 knots, labelled 206 are entered into both channels from the data sources 14, 16 and are correctly stored in the message stores 42, 44, from which they are retrieved and upon comparison found to be substantially identical. They therefore are presumed to be correct. Conventionally, as many as practicable of the components in channel 12 differ in design and manufacturing source from the corresponding components of channel 10. Here the data sources 14, 16 and the processors 46, 48 are shown as of different types. The bus interfaces 34, 36 are shown as of the same type, in order to demonstrate the consequences of a data-dependent common-mode failure in those components.

Figure 2:
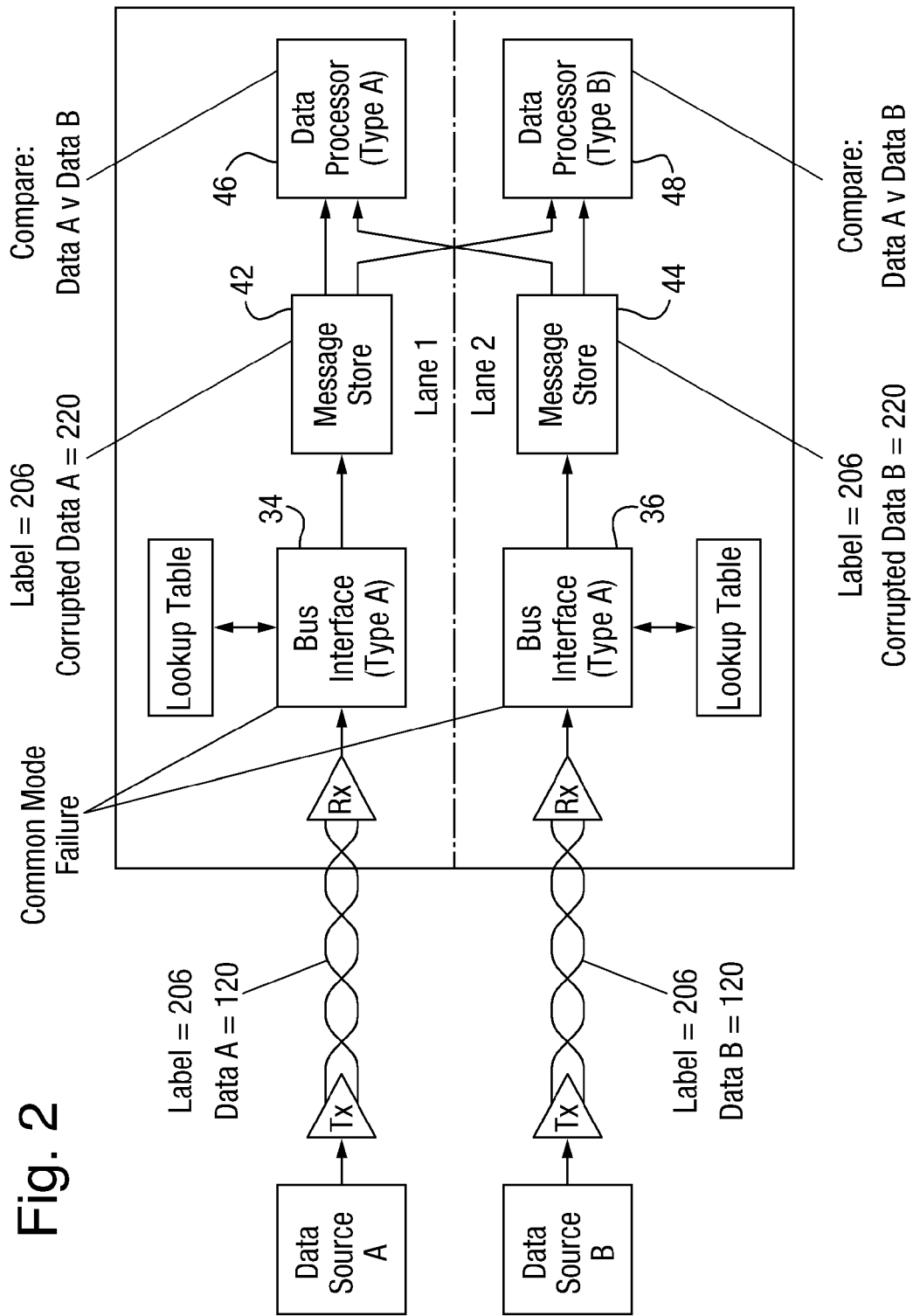
FIG. 2 shows the system of FIG. 1, having suffered a common mode failure.

Referring to FIG. 2, the messages input to the bus interfaces 34, 36 once again each are address label 206, data 120 knots. However, the interfaces each fail in the same way, and output corrupted data of 220 knots to the message stores 42, 44. The stored corrupted messages are read and compared by the processors 46, 48 and found to agree. The common-mode failure thus is undetected, clearly a dangerous situation since the airspeed is grossly over-stated and the air data computer may well allow the aircraft to stall.

Figure 3:
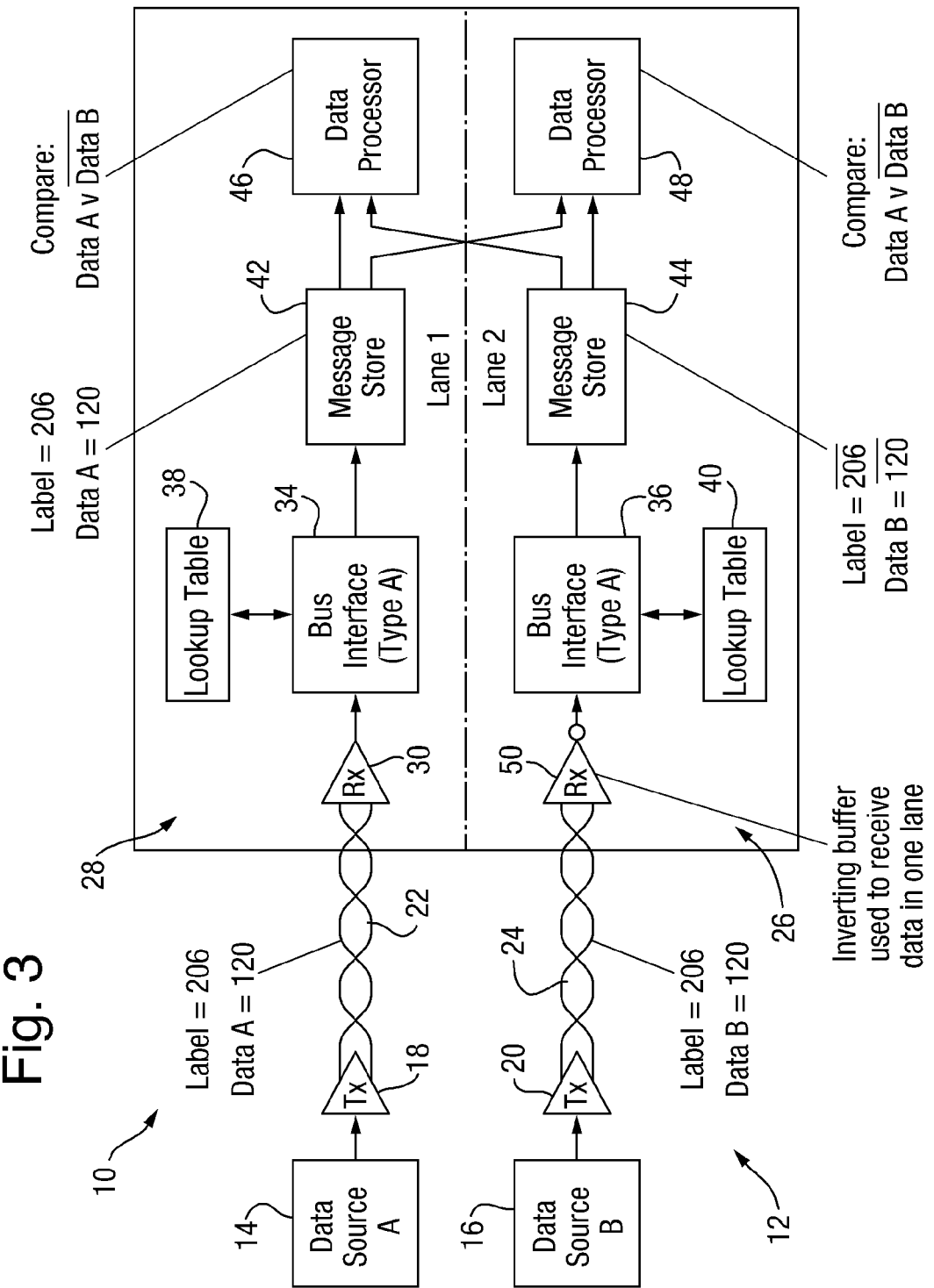
FIG. 3 shows a data transmission system of the invention.

A system according to the invention, shown in FIG. 3, is resistant to this form of undetected common-mode failure. Save as hereafter described, the system is identical to that of FIG. 1.

The buffer amplifier 32 of the second channel 12 is replaced by an inverting buffer amplifier 50, which inverts the logic of data passing through it. Thus a word of for example 101101 input to the inverting buffer 50 is output from it as 010010. One of the data processors 46 or 48 is programmed to invert the logic of messages drawn from its respective store 42 or 44.

As with the FIG. 1 system, the data sources 14, 16 issue identical messages labelled 206, indicating 120 knots. At inverting buffer 50 the message in channel 12 has its logic inverted to address label $\overline{206}$, data $\overline{120}$. The message passing through buffer 30 of channel 10 is unchanged at 206, 120.

Bus interface 34 directs the message data 120 to address 206 of store 42, as in the FIG. 1 system. Bus interface 36 however directs the inverted channel 12 message data $\overline{120}$ to a different address $\overline{206}$ in store 44. The data processors 46, 48 read the two data messages from their respective addresses, and having inverted the logic of one of them (conveniently that in channel 12, being the channel that has had its input data logic inverted) compares them. Thus the comparison is either 120 with 120 or $\overline{120}$ with $\overline{120}$, and the messages are found to agree.

Figure 4:
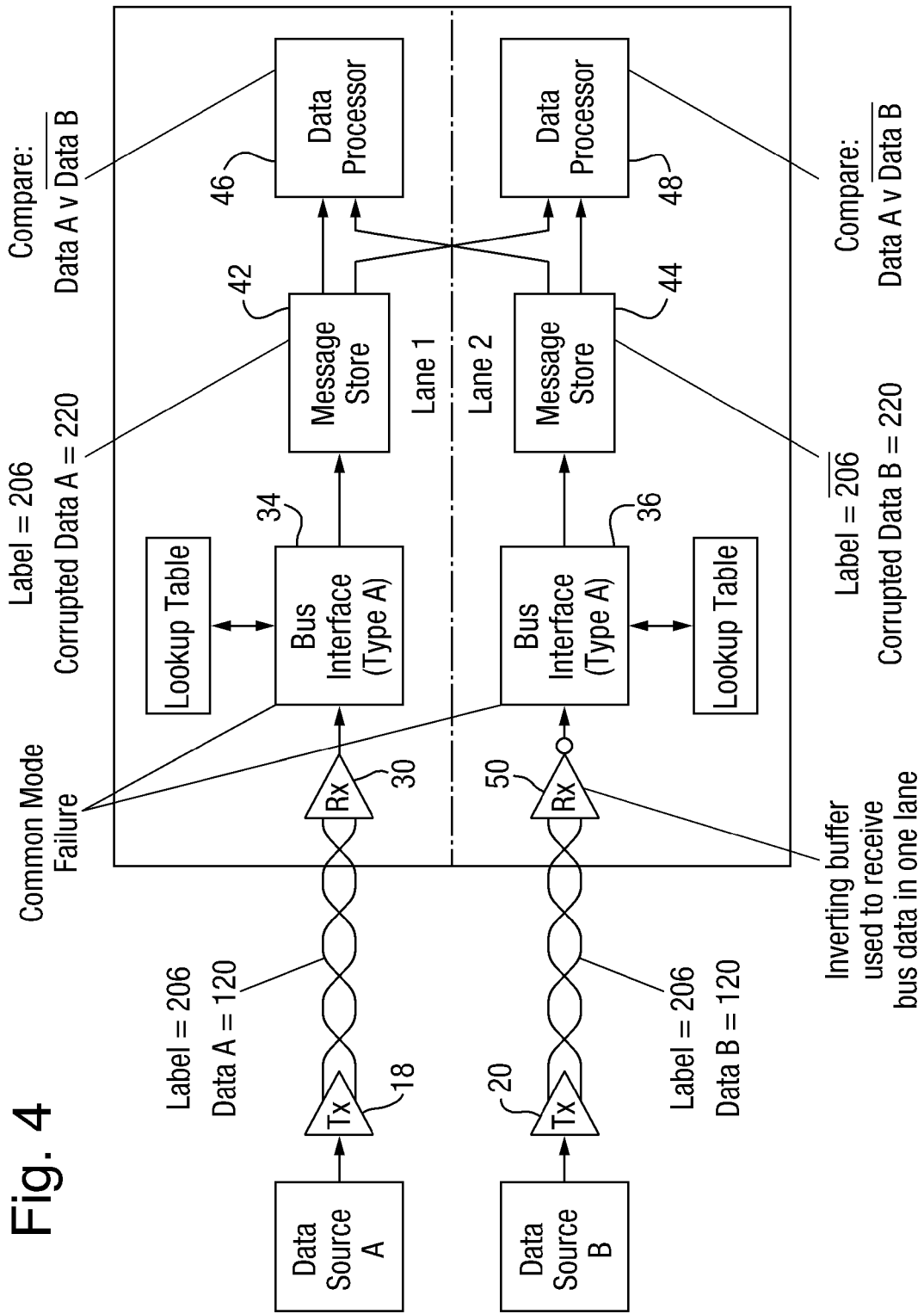
FIG. 4 shows the system of FIG. 3, having suffered a common mode failure.

Considering now a common-mode failure in the interfaces 34, 36 as illustrated in FIG. 4, the input airspeed data 120 in channel 10 and the inverted data [120] in channel 12 both are corrupted to 220. Their address labels 206, $\overline{206}$ are assumed not to be corrupted (if the addresses were corrupted, the messages could not be read by the processor 46, 48 and so the failure would be detected). The two corrupted data sets 220, 220 are stored at their correct addresses 206, $\overline{206}$ in stores 42, 44 and are read by the data processors 46, 48. The processors invert one of the read data sets, and thus seek to compare 220 and $\overline{220}$. The mismatch and the common-mode failure in the interfaces is thereby detected.

Although as described the first data inversion in channel 12 is performed by the inverting buffer 50, it could equally well be performed before the data is inserted into the bus 24, e.g. by employing an inverting transmitter buffer amplifier instead of non-inverting buffer amplifier 20. This can guard also against a common-mode failure in the data busses 22, 24. Indeed, in principle the invention can protect against common-mode failures in all components of the system between the first inversion of the data in one of the channels and the subsequent re-inversion by the data processors 46, 48. In particular, the inversion of the address label 206 results in the messages being stored at different addresses in the stores 42, 44. Thus a common-mode failure relating to a single address in the two stores can be detected.

Whilst the invention has been described in the context of undetected common mode failures in instrumentation (reporting) data channels, it is equally applicable to the avoidance of such failures in command data channels.

The invention also includes any features or combination of features herein disclosed, whether or not specifically claimed. The abstract as filed is repeated here as part of the specification; a method of high-integrity data transmission comprises transmitting nominally-identical data via first and second channels, inverting the logic of the data in the second channel, receiving the data via a respective data handling device for each channel, inverting the logic of data outputted by one of the data-handling devices and comparing the so-inverted data with data outputted by the other data handling device. The invention is relevant to the avoidance of common-mode failure in aircraft, other vehicles and plant employing high-integrity data systems.

The invention claimed is:

1. A data receiver for use with a data-transmission system having a first channel and a second channel for transmitting nominally-identical data, the receiver comprising:
    inputs for receiving separately a first message including a first address label and first data from the first channel and a second message including a second address label and second data from the second channel;
    an inverting mechanism for logically inverting the second message received from the second channel;
    first and second data-handling devices for receiving separately the first message from the first channel and the inverted second message from the second channel, respectively, and outputting separately the first message to a first message store for storing at a first address coincident with the first address label and the inverted second message to a second message store for storing at an inverted second address coincident with the second address label as inverted; and
    a processor configured to retrieve the inverted second message from the second message store, to re-invert the inverted second data to retrieve the first message from the first message store at the first address and to compare the first data and the re-inverted inverted second data to identify a common mode failure.

2. The data receiver of claim 1 wherein the inverting mechanism is an inverting buffer amplifier.

3. The data receiver of claim 1, in combination with the data transmission system having the first channel and the second channel for transmitting the nominally-identical data.

4. The data receiver of claim 1 wherein the data-handling devices are interfaces.

5. The data receiver of claim 1 wherein the data-handling devices are interfaces and the interfaces comprise look-up tables for identifying addresses of messages within the data, the look-up table of one of the interfaces having inverted logic relative to that of another of the interfaces.

6. The data receiver of claim 1, wherein the receiver comprises:
    the first and second message stores for the first and second channels, respectively.

7. Plant, an aircraft or other vehicle comprising, in combination, the data receiver according to claim 1.

8. A data receiver for use with a data-transmission system having a first channel for transmitting a first message and a second channel for transmitting nominally-identical data, including a second message logically inverted relative to the first message, the receiver comprising:

respective data-handling devices for receiving and outputting separately the first message including a first address label and first data from the first channel and the inverted second message including a second address label being inverted and inverted second data from the second channel;

first and second data-handling devices for receiving separately the message from the first channel and the second message from the second channel, respectively, and outputting separately the first message to a first message store for storing at a first address coincident with the first address label and the inverted second message to a second message store for storing at an inverted second address coincident with the second address label as inverted; and a processor configured retrieve the inverted second message from the second message store, to re-invert the inverted second data, to retrieve the first message from the first message store at the first address and to compare the first data and the re-inverted inverted second data to identify a common mode failure.

9. The data transmission system comprising:

having the first channel and the second channel for transmitting nominally-identical data;

means for logically inverting the second data in the second channel; and the receiver according to claim 8.

10. A method of high-integrity data transmission comprising:

transmitting nominally-identical data via first and second channels, including a first message having a first address label and first data and a second message having a second address label and second data;

logically inverting the second message including the second data and the second address label in the second channel;

receiving the first and second messages via respective data handling devices for each channel and storing the first message to a first message store at a first address coincident with the first address label and the second message to a second message store at an inverted second address coincident with the second address label as inverted;

retrieving the inverted second message from the second message store re-inverting the inverted second data, retrieving first message from the first message store at the first address; and comparing the first data and the re-inverted inverted second data to identify a common mode failure.

11. The method of claim 10, wherein the logic of the second message is inverted before the second message is transmitted.

12. The method of claim 10, wherein the logic of the second message is inverted after reception but before the second message is inputted to the data handling device of the second channel.

* * * * *